United States Patent

[11] 3,582,932

| [72] | Inventor | Richard M. Chapman |
| | | Columbus, Ohio |
| [21] | Appl. No. | 766,771 |
| [22] | Filed | Oct. 11, 1968 |
| [45] | Patented | June 1, 1971 |
| [73] | Assignee | F. W. Bell Inc. |
| | | Columbus, Ohio |

[54] MAGNETIC-FIELD-RESPONSIVE PROXIMITY DETECTOR APPARATUS
12 Claims, 1 Drawing Fig.

[52] U.S. Cl. ................................................ 340/258, 340/38, 324/45
[51] Int. Cl. ................................................ G08b 13/24
[50] Field of Search ........................................ 340/38, 38 L, 258, 258 L, 255 D; 324/41, 45

[56] References Cited
UNITED STATES PATENTS

| 3,195,043 | 7/1965 | Burig et al. | 324/45 |
| 3,266,028 | 8/1966 | Taylor et al. | 340/38X |
| 3,408,563 | 10/1968 | Chapman et al. | 324/45 |
| 3,430,221 | 2/1969 | Barringer et al. | 340/258 |
| 3,436,725 | 4/1969 | Spofford et al. | 340/258X |
| 3,500,310 | 3/1970 | Marcinkiewicz | 340/38 |

Primary Examiner—John W. Caldwell
Assistant Examiner—Perry Palan
Attorney—Mahoney, Miller & Stebens ABSTRACT: The ferromagnetic material comprising a motor vehicle will result in distortion of an environmental magnetic field primarily comprised of a portion of the earth's magnetic field and a detector apparatus is provided for sensing this field. The detector apparatus includes a magnetic field-sensing probe positioned in electromagnetically coupled relationship to this environmental magnetic field and provides a probe output voltage signal proportionally related to the magnetic field sensed and indicative of vehicle-produced distortions. An output circuit connected to receive this signal is controlled in its operation by a control circuit which is capable of maintaining detecting capability as to vehicle-caused distortions of the magnetic field irrespective of changes in the quiescent magnetic field intensity of the environmental magnetic field. This capability is effected by a regulating amplifier through a feedback connection from the output circuit.

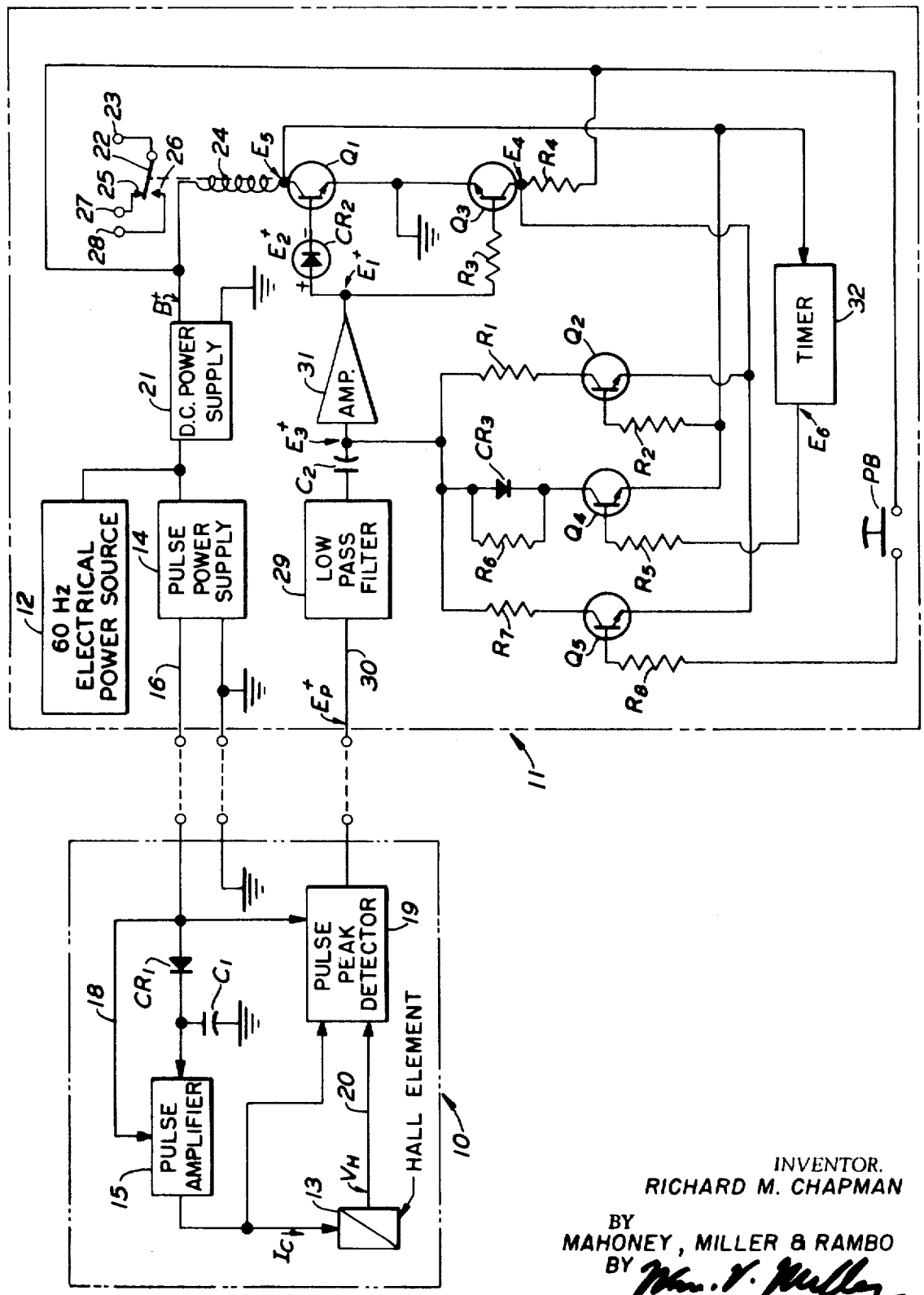

3,582,932

MAGNETIC-FIELD-RESPONSIVE PROXIMITY DETECTOR APPARATUS

GENERAL DESCRIPTION OF THE INVENTION

Object-caused distortions of an environmental magnetic field having a normal quiescent intensity level are sensed by a Hall-effect device which forms an electrical probe output signal which is proportional in magnitude to the sensed magnetic field intensity level. A detecting and analyzing circuit connected to receive the probe output signal controls an output switch in accordance with the increase or decrease of the sensed magnetic field intensity relative to a predetermined level which increase or decrease results from the passage of a magnetic-field-effecting object through this environmental field. Changes in the quiescent magnetic field intensity resulting from the presence of a proximately disposed object which would initially distort the environmental magnetic field producing an increase in the sensed magnetic field intensity level are accommodated by the detecting and analyzing circuit which alters the reference level thus enabling the apparatus to effectively detect subsequent object-effected, magnetic field distortions of a transient nature and provide an output signal. A subsequent reduction in the magnetic field intensity level to a point not less than the original calibrating field results in reversion of the reference level to the original state or in reduction to an intermediate correlated level. The apparatus is discriminatory in that magnetic field distortions resulting in a predetermined minimum magnetic field intensity level change are required to produce an output signal whether in association with a normal or abnormal quiescent field.

These and other objects and advantages of this invention will be readily apparent from the following detailed description of an embodiment thereof and the accompanying drawing.

The sole FIG. of the drawing is a schematic diagram of the electrical circuit of a magnetic-field-responsive proximity detector apparatus embodying this invention.

Referring to the drawing, an embodiment of the invention is schematically illustrated solely by an electrical circuit diagram as the mechanical structure of the several components and the installation and operation of the system will be readily apparent from an understanding of the electrical circuit. In a typical installation of the apparatus for vehicle detection as in a traffic control system, a magnetic-field-sensing probe designated generally by the numeral 10, would be positioned closely adjacent to a vehicle traffic lane, as at a street intersection, and is electrically connected by suitable cables to the several components of a remote power supply and control unit indicated generally at 11. In a typical traffic control installation, the power supply and control unit may be physically located in the usual system control box that houses other components of a control installation which do not form a part of this invention and are not illustrated and described. It will suffice for the purpose of illustrating an application of this invention to note that the control unit provides an output signal in the form of an electromechanical relay operation with the relay contacts being incorporated in the conventional control system for operation of the related traffic signal lights.

The general purpose of proximity detector apparatus in vehicular traffic control installations is for option-type control of traffic in specified turn lanes at intersections for more expeditious handling of traffic in accordance with traffic volume. Accordingly, a vehicle-detecting probe is proximately disposed to the traffic lane which is to be controlled and responds to the passage of vehicles into or through a specific zone of this traffic lane. The detecting probe of this invention is of a magnetic-field-sensing type and must be so positioned relative to the traffic lane that a vehicle will sufficiently distort the localized earth's magnetic field as to provide a detectable indication for the apparatus. Since a direct physical or mechanical contact with the vehicle is not necessary, the magnetic-field-sensing probe 10 may be advantageously buried in the roadway of a traffic lane at the desired point. The specific location of the probe relative to the intersection controlled is determined by the particular traffic conditions which are considered at the time of installation. Accordingly, a probe installation is not illustrated or further described in this disclosure as the installation will be apparent from an understanding of the electrical circuit and operation of the apparatus.

In accordance with this invention, the probe 10 utilizes a Hall-effect device 13 for sensing the environmental magnetic field. The Hall-effect device or element 13 or Hall-generator is driven by a pulse-form control current $I_c$ and thus produces a pulse-form Hall-voltage $V_H$ at its output terminals with the magnitude of the output proportionally related to the magnetic field coupled with the device. The pulse-form control current $I_c$ is supplied by a pulse power supply 14 operating through a pulse amplifier 15 with electrical power initially being provided through a connection to a suitable source of alternating current power 12 such as the conventional 60 Hz. residential distribution power. Such a power source is only diagrammatically indicated in the drawing and it will be understood that other well known power sources having similar characteristics may also be utilized. Physical construction and electrical circuitry of a suitable pulse power supply 14 are well known and it will suffice for this description to note that the pulse power supply produces a direct current voltage which is cyclically grounded at predetermined intervals. The cyclic frequency of grounding may conveniently occur at the cyclic frequency of the power source resulting in grounding the output voltage of the pulse power supply for a short time interval every one-sixtieth second. A suitable conductor 16 connected with the output of the pulse power supply 14 connects with the remotely located probe 10 to supply DC power for operation of the probe. A ground conductor 17 may also be provided for interconnection between the pulse power supply 14 and the probe 10 to assure a positive electrical ground return.

Also interconnected with the pulse amplifier 15, which preferably comprises a solid-state circuit, is an energy storage network providing power for the pulse amplifier. This storage network includes a capacitor $C_1$ connected in shunt relationship to the conductor 16 and input to the amplifier and a diode $CR_1$ series connected to permit charging of the capacitor. Control input to the amplifier is completed by conductor 18 which is connected with the power conductor 16 at the cathode terminal side of the diode $CR_1$. The pulse amplifier 15 of the present embodiment is designed to provide a zero control current $I_c$ when a positive voltage is supplied by the pulse power supply to the storage network and control input via conductor 18. While the application of a positive voltage results in charging of the capacitor $C_1$, this same positive voltage maintains the amplifier in a cutoff condition through the conductor 18. When the conductor 16 is grounded as a consequence of the cyclic operation of the pulse power supply 14, the diode $CR_1$ will be reverse biased preventing discharge of $C_1$ back into the pulse power supply through lead 16. Also, the pulse amplifier 15 will be turned on by the grounding of conductor 18 through conductor 16 thus providing a conductive path through the amplifier and discharge of the capacitor $C_1$. Discharge of the capacitor $C_1$ through the pulse amplifier 15 forms a large magnitude, pulse-form control current $I_c$ which drives the Hall-generator 13 resulting in a Hall-voltage output $V_H$ proportional to the magnetic field sensed by the Hall-element.

One major purpose of utilizing a pulse-form control current $I_c$ for driving of the Hall-element is that a low duty factor is attained which allows higher peak currents without damage to the Hall-generator. Using a higher peak control current $I_c$ increases the sensitivity of the probe to magnetic fields thus enhancing the detection capability of the apparatus. Secondly, utilizing the 60 Hz. pulse frequency substantially eliminates interference from 60 Hz. AC magnetic fields which may be produced by the power source or environment and in coupled relationship with the Hall-generator 13. The effect of a 60 Hz. AC magnetic field will either be eliminated from the Hall-element output voltage $V_H$ or will be added in as if it were a DC magnetic field. In the latter case, since the earth's magnetic field is of a direct current nature, the effect would merely be an increase in the environmental magnetic field sensed by the probe.

The Hall-generator output voltage $V_H$ is transmitted by an interconnecting conductor 20 to a pulse peak detector 19 which stores the voltage pulse from one pulse to the next. Thus, the detector 19 produces a DC voltage which is proportional to the environmental magnetic field intensity and is designated as the probe output voltage Ep. Electrical power for operation of the detector which is of a well-known construction and is not otherwise described, is obtained through an interconnection with the pulse power source 14. An interconnection of the detector with the pulse amplifier output provides for synchronous operation.

Included in the remote power supply and control unit 11 is an output circuit, a control circuit and a DC power supply 21 which, in the illustrated embodiment, is connected to receive power from the 60 Hz. source and provides an appropriate voltage B+ for operation of the output and control circuits. The output circuit comprises an electrical switch element 22 of the two-position type connected to a circuit terminal 23 and which is actuated by a relay-type solenoid having a selectively energizable coil 24. A pair of electrical contacts 25 and 26 are alternatively engaged by the switch element 22 with the contact 25 in engagement with the switch element when the relay coil 24 is deenergized. Each contact 25 and 26 is also connected to a respective circuit terminal 27 and 28 with the three circuit terminals connectable in the electrical circuit of the apparatus to be controlled thus providing two operating states which are associated with respective output signals for the apparatus. Which operating state is selected is dependent on energization of the relay coil 24 and one terminal of the coil is connected to the B+ output of the power supply 21 with the other terminal selectively connectable to a ground terminal through an electronic switch device comprising a relay driver transistor $Q_1$ having its collector-emitter terminals series connected with the coil. Biasing of transistor $Q_1$ for selective operation in either a conductive ON state or nonconducting OFF state is effected by the control circuit in response to the received probe output voltage signal Ep. When the relay driver transistor $Q_1$ is biased to the ON state, current will flow through the relay coil 24 and transistor resulting in energization of the coil and actuation of the switch element 22 to its alternate position in engagement with contact 26.

In the control circuit, an electronic filter 29 of a low-frequency pass-band design is series connected in an input conductor 30 connecting with the output of the remote pulse peak detector 19 and passes the DC probe output voltage signal Ep. The filter is designed to substantially eliminate or block all extraneous voltage signals having time varying components that may be induced in the conductor 30 and would otherwise produce an erroneous signal in the control circuit. After passing through the filter 29, the probe voltage signal Ep is applied to a storage capacitor $C_2$ series connected between the filter output and the input terminal of a positive gain amplifier 31 having a very high input impedance. The output terminal of the amplifier 31 is connected to the base terminal of the relay driver transistor $Q_1$ through a silicon diode $CR_2$ and the amplified probe voltage signal $E_1$ at the amplifier output terminal in conjunction with the voltage drop $E_2$ across the diode $CR_2$ biases the emitter-base junction of $Q_1$. The amplifier output voltage $E_1$ and the diode voltage drop $E_2$ are of opposed polarity with the diode voltage drop $E_2$ reverse biasing the emitter-base junction of the relay driver transistor $Q_1$. In the normal quiescent operating state for the apparatus with an undistorted environmental magnetic field sensed by the probe 10, the resultant probe output voltage Ep does not exceed the predetermined level at which the amplifier output voltage $E_1$ is approximately equal to the diode voltage $E_2$ but of opposite polarity. In this operating condition, the emitter-base junction of transistor $Q_1$ will not be forward biased and the transistor will remain in its normal OFF state. A distortion of the sensed environmental magnetic field which produces a probe voltage Ep exceeding the predetermined level resulting in a corresponding increase in the amplifier output voltage $E_1$ to a value which exceeds the diode voltage $E_2$ results in forward biasing of the emitter-base junction and consequent switching of the relay driver transistor $Q_1$ to a conductive ON state.

The normal quiescent operating condition with the relay driver transistor $Q_1$ in an OFF state is maintained through operation of a negative feedback connection which enables the apparatus to discriminate as to nonobject or nonvehicle caused magnetic field distortions. This negative feedback connection comprises a switching transistor $Q_2$ having its collector terminal connected to the input terminal of the amplifier 31 through a relatively large value resistor $R_1$. The emitter terminal of transistor $Q_2$ is connected to the collector and output terminal of a regulating amplifier transistor $Q_3$ having a grounded emitter while the base terminal is connected through a resistor $R_2$ to the collector terminal of relay driver transistor $Q_1$. With transistor $Q_1$ in an OFF state, its collector voltage $E_5$ will essentially be that of the DC output B+ of the power supply 21 which will forward bias the emitter-base junction of transistor $Q_2$ resulting in switching of transistor $Q_2$ to a conductive or ON state. The amplifier output voltage $E_1$ is applied to the base terminal of transistor $Q_3$ through a resistor $R_3$ and provides forward biasing of the emitter-base junction while the collector terminal is connected to the output of the DC power supply 21 through a resistor $R_4$. Voltage $E_1$ biases transistor $Q_3$ to a conductive state and a voltage $E_4$ will be provided at the output terminal of the regulator amplifier transistor $Q_3$ as regulated by voltage $E_1$. With transistor $Q_2$ switched to an ON state, a negative feedback connection is provided between the output of the regulator amplifier transistor $Q_3$ and the input to the amplifier 31 and current will be drained from or supplied to the storage capacitor $C_2$ to establish voltage $E_3$ equal to voltage $E_4$. In this OFF regulating condition, an increase in the probe output voltage Ep at a relatively slow rate will not be effective in creasing the amplifier output voltage $E_1$ sufficiently to exceed the diode $CR_2$ voltage $E_2$ and the relay driver transistor $Q_1$ will remain OFF or nonconducting.

This feedback connection is not capable of maintaining voltage $E_3$ equal to $E_4$ in the intended application of the apparatus of detecting the presence of a vehicle in proximate relationship to the probe 10. An automotive vehicle passing in close proximate relationship to the probe will tend to concentrate the magnetic field and thus raise the probe output voltage Ep resulting in an increase in the amplifier input voltage $E_3$. An increase in the amplifier input voltage $E_3$ produces a corresponding increase in amplifier output voltage $E_1$ causing the regulator amplifier output voltage $E_4$ to decrease. With voltage $E_4$ now less than $E_3$, current will drain from storage capacitor $C_2$ through resistor $R_1$ and transistors $Q_2$ and $Q_3$ tending to bring voltage $E_3$ down to the OFF regulating condition previously described. For a rapid increase in Ep or $E_3$, the feedback connection will not be capable of reestablishing $E_3$ equal to $E_4$ due to the selection of a large value resistor $R_1$ and the amplifier output voltage $E_1$ will continue to rise and when the diode voltage $E_2$ is exceeded, the relay driver transistor $Q_1$ will be switched to an ON state. The relay coil 24 will be energized thus actuating the switch element 22 and the collector terminal voltage $E_5$ will drop to a low value thereby removing the emitter-base bias voltage of switching transistor $Q_2$ which will now be turned off and prevent further current drain from capacitor $C_2$. Actuation of switch element 22 provides the physical indication or output signal that the apparatus has detected the presence of a proximately located vehicle and the circuit will remain in this configuration for as long as the vehicle remains in close proximate relationship to the probe. Voltage $E_3$ will remain higher than its quiescent point or OFF regulating level thus maintaining transistor $Q_1$ ON and relay coil 24 energized since transistor $Q_2$ is OFF and prevents current drain from capacitor $C_2$.

If the vehicle thus detected should leave the proximate position relative to the probe 10, the probe output voltage Ep will drop to its quiescent value, and voltage $E_3$ will drop thus reducing the amplifier output voltage $E_1$ to a value below the diode voltage drop $E_2$ resulting in "turnoff" of transistor $Q_1$. With the relay driver transistor $Q_1$ OFF, the relay coil 24 is deenergized thereby releasing the switch element 22 to its normal position and the collector terminal voltage $E_5$ of transistor $Q_1$ will increase and turn transistor $Q_2$ ON to restore the feedback connection to the previously described OFF regulating condition ready for detection of a succeeding vehicle.

The apparatus of this invention is designed to continue detection of vehicles passing or positioned in close proximate relationship to the probe 10 even though an abnormal condition should occur in the environmental magnetic field which would erroneously indicate the proximity of a vehicle. Examples of abnormal conditions include inadvertent placement of a piece of scrap metal in close proximate relationship to the probe 10, displacement of the probe from its originally installed and calibrated position, and the placement of a large magnetic-field-distorting body such as an iron telephone pole at the side of the road which will all have a substantial effect on the magnetic field as to be equivalent to the field distortion produced by a vehicle. Through incorporation of a second feedback connection in the control circuit, a significant change in quiescent magnetic field sensed by the probe which would produce an increase in the probe voltage Ep of a magnitude that would cause the relay driver transistor $Q_1$ to switch to or stay in a conducting ON state will be accommodated in that the apparatus will sense the minimum field change relative to the new quiescent magnetic field level. Subsequent to a significant change in the quiescent magnetic field, the apparatus functions as previously described to detect the presence of a vehicle in close proximity to the probe.

This second feedback connection comprises a switching transistor $Q_4$ having its collector terminal connected to the input terminal of the amplifier 31 and its emitter terminal connected to the collector terminal of the relay driver transistor $Q_1$. The base terminal of transistor $Q_4$ is connected through a resistor $R_5$ to a timer-actuated switch mechanism 32. This switch mechanism 32 which is of a well known construction comprises a circuit whose output voltage $E_6$ rises from zero to a predetermined positive value through the action of an incorporated timing mechanism. The timing operation is initiated when the collector voltage $E_5$ drops due to switching of transistor $Q_1$ to an ON state and, after expiration of a predetermined time interval, the output voltage $E_6$ rises from the normal zero value to the positive value. This timer switch mechanism is of a type which resets itself upon reapplication of the relatively high magnitude voltage $E_5$ such as the B+ from the DC power supply 21 when transistor $Q_1$ switches to a nonconductive OFF state. This time interval is determined from a consideration of factors peculiar to a specific installation but would normally not be less than the turn cycle time for the specific installation. Interposed in the collector circuit of transistor $Q_4$ is a diode $CR_3$ connected to permit current flow from the amplifier input to the collector terminal. A resistor $R_6$ is connected in shunt relationship to the diode $CR_3$ and has an impedance greater than the forward impedance of the diode to substantially eliminate current flow through the resistance while the diode is conducting in a forward direction but less then the reverse impedance of the diode to accommodate current flow in the opposite direction.

In considering the operation of the second feedback connection, it will be assumed that a vehicle has been detected in proximate relationship to the probe 10 causing the probe voltage Ep to rise and resulting in turn-on of the relay driver transistor $Q_1$ as previously described. Transistor $Q_2$ of the first feedback connection will now be in a nonconducting OFF state and voltage $E_5$ applied to the timer switch mechanism 32 will have dropped to initiate a timing operation. Assuming that the vehicle does not leave its proximate position relative to the probe before expiration of the predetermined time interval, the output voltage $E_6$ of the timer mechanism 32 will rise to the positive value due to action of the circuit resulting in forward biasing of the emitter-base junction of transistor $Q_4$ which is now switched to a conductive ON state thereby completing a connection between the amplifier input and the collector terminal of the relay driver transistor $Q_1$. Current will be drained from the storage capacitor $C_2$ through diode $CR_3$ thus decreasing $E_3$ which was initially increased above the normal quiescent level as previously regulated by the first feedback connection. A decrease in amplifier input voltage $E_3$ results in a corresponding decrease in the amplifier output voltage $E_1$ until it matches the voltage drop $E_2$ of diode $CR_2$. This would tend to switch the relay driver transistor $Q_1$ to an OFF state and the collector voltage $E_5$ will begin to rise. When voltages $E_3$ and $E_5$ are equal, current will no longer be drained from the capacitor $C_2$ and current will not be supplied to the capacitor. Since the collector terminal voltage $E_5$ equals the amplifier input voltage $E_3$ and $E_3$ is sufficiently low, the relay driver transistor $Q_1$ remains in a conductive ON state and the relay coil 24 remains energized. The circuit will remain in this ON regulating condition for as long as the vehicle remains in proximate relationship to the probe since this feedback connection tends to hold the charge on capacitor $C_2$ and to maintain voltages $E_3$ and $E_5$ equal.

When the vehicle leaves its position in proximate relationship to the probe 10, the probe output voltage Ep will drop to its quiescent state and the control circuit will revert from the described ON regulating condition to the normal quiescent OFF regulating condition. A decrease in probe output voltage Ep results in a decrease in amplifier input voltage $E_3$ and consequent decrease in amplifier output voltage $E_1$ to a level less than the voltage drop $E_2$ across the diode $CR_2$. Under this condition, the collector terminal voltage $E_5$ of the relay driver transistor $Q_1$ will rise and supply current to capacitor $C_2$ through transistor $Q_4$ and resistance $R_6$ which will tend to cause the amplifier input voltage $E_3$ to rise. Resistance $R_6$ is selected to be of a sufficiently large magnitude so that the decrease of voltage $E_3$ due to the normally rapid decrease in voltage Ep caused by the vehicle will exceed any increase due to increase in voltage $E_5$ and there will be a resultant decrease in voltage $E_3$. When voltage $E_5$ becomes high enough, the relay driver transistor $Q_1$ will switch to an OFF state resulting in deenergization of the relay coil 24. This also results in turn-on of transistor $Q_2$ which reestablishes the OFF regulating feedback connection first described and in reset of the timer actuated switch mechanism 32. Reset of the switch mechanism 32 reduces the output voltage $E_6$ to zero thus switching transistor $Q_4$ to an OFF state and disconnecting the second feedback connection. AT this point, the control circuit has completed reversion to the quiescent OFF regulating condition and is ready to detect the next vehicle.

In the event that the quiescent magnetic field is disturbed by a nonvehicle object to such an extent as to result in energization of the relay coil 24, the control circuit will respond in the previously described manner to obtain the ON regulating condition after the timed interval as determined by the timer switch mechanism 32 has been exceeded. This condition results since this disturbance is assumed to be of a permanent nature and the timer-actuated switch mechanism 32 will function as previously described. As a consequence, the relay coil 24 remains energized with the switch element 22 actuated to engage the contact 26. A vehicle coming into proximity to the probe now will cause a second increase in the magnetic field and concurrent increase in probe output voltage Ep. An increase in voltage Ep will tend to increase the amplifier input voltage $E_3$ with a consequent increase in amplifier output voltage $E_1$ and decrease in voltage $E_5$ at the collector terminal of transistor $Q_1$. This decrease in voltage $E_5$ further drains current from capacitor $C_2$ through diode $CR_3$ and effectively prevents an increase in amplifier input voltage $E_3$ even though there is an increase in the probe output voltage Ep. Thus, the amplifier input voltage $E_3$ will be held at the level attained for the ON regulating condition.

Assuming now that the vehicle leaves its position in proximate relationship to the probe, the probe output voltage Ep will decrease to the new quiescent level established by the disturbance and the amplifier input voltage $E_2$ tends to follow this decrease. This results in a decrease in the amplifier output voltage $E_1$ causing the collector terminal voltage $E_5$ of the relay driver transistor $Q_1$ to rise. Since voltage $E_5$ is now greater than $E_3$, current will be supplied to capacitor $C_2$ but, since this current must flow through the high-value resistor $R_6$, the voltage $E_3$ will continue to drop along with Ep resulting in switching of the relay driver transistor $Q_1$ to an OFF state. The voltage $E_5$ will now further increase and switch transistor $Q_2$ to an ON state thus reestablishing the OFF regulating connection as between the voltages $E_3$ and $E_4$ and the control circuit will operate around this new quiescent magnetic field in detecting vehicles. It will also be noted that the increased voltage $E_5$ reset the timer actuated switch mechanism 32 and dropped voltage $E_6$ to zero which switched transistor $Q_4$ to an OFF state thus disrupting the second feedback connection.

Operation of the apparatus will continue at this new quiescent magnetic field level unless some event should occur that would significantly affect the magnetic field. Whether this effect would be an increase or decrease, the circuit will adjust to operate about the new quiescent magnetic field and continue detection of vehicles which approach the probe 10 in close proximate relationship.

A manual reset circuit is also incorporated in the control circuit to facilitate initial setting up of the detector and subsequent checking or maintenance operations. This reset circuit comprises a switching transistor $Q_5$ connected in shunt relationship to both feedback connections with the collector terminal connected through a resistor $R_7$ to the amplifier input terminal and the emitter terminal connected to the collector terminal of the regulator amplifier transistor $Q_3$. The base terminal of transistor $Q_5$ is connectable to the DC power supply 21 through a resistor $R_8$ and a normally open, manually operated switch PB of the pushbutton type. Closing of switch PB forward biases the emitter-base junction of transistor $Q_5$ which will switch to a conductive ON state and thus forms an alternate feedback connection which can supply or drain current from the capacitor $C_2$. Resistor $R_7$ is selected to be of a magnitude less than either resistor $R_1$ or $R_6$ and will thus be capable of returning the control circuit to an OFF regulating condition from any other condition.

It is readily apparent from the foregoing detailed description of an embodiment of this invention that a novel proximity detector apparatus is provided which is responsive to magnetic-field disturbances and is, therefore, capable of detecting ferromagnetic objects which come into proximate relationship to a magnetic-field-sensing probe. Through incorporation of feedback connections in the control circuit, the apparatus is capable of detecting the intended proximately disposed ferromagnetic objects even though the quiescent environmental magnetic field may be affected to such an extent by objects other than those which the apparatus is intended to detect so as to normally produce an erroneous response. The feedback circuit connections enable the apparatus to accommodate nonobject caused steady state changes in the environmental magnetic-field intensity level and to continue detection of objects as intended.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, I claim:

1. A magnetic-field-responsive proximity detector apparatus comprising

A. a magnetic-field-sensing probe having a magnetic-field-sensing device positionable in magnetically coupled relationship to an environmental magnetic field for responding thereto in forming a probe output voltage signal related to the magnitude of the magnetic field sensed, said environmental magnetic field having a normal quiescent state subject to distortion by ferromagnetic objects which results in an increase in said probe output voltage signal relative to a normal quiescent level, B. an output circuit having first and second operating states providing associated output signals, said output circuit normally being in said first operating state and switchable to said second operating state in response to receipt of a control signal, and C. a control circuit connected to said probe and said output circuit and providing said control signal for switching said output circuit between said first and second operating states in response to said probe output voltage signal, said control circuit including a voltage-level-sensing circuit having an input responding to an increase of at least a predetermined magnitude in said probe output voltage signal to provide said control signal for switching said output circuit to the second of said two operating states, said voltage-level-sensing circuit including a switching device connected to a voltage source and having an output terminal providing a relatively high voltage when said device is nonconducting and a relatively low voltage when said device is conducting, and a voltage-level-regulating circuit including a regulated voltage source, a first feedback circuit connected between said switching device output terminal, said regulated voltage source and said level-sensing circuit input for regulating the voltage at said input at a normal quiescent level only when the increase in input voltage is less than a predetermined magnitude above said quiescent level, and a second feedback circuit connected between said switching device output and said voltage-level-sensing circuit input for regulating the voltage at said input at a level greater than a normal quiescent level after lapse of a predetermined time interval subsequent to switch of said output circuit to said second operating state, said second feedback circuit responding to a subsequent increase in the voltage at said input greater than said predetermined magnitude to return control of voltage-level-regulating to said first feedback circuit when the voltage at said input decreases an amount at least equal to said predetermined magnitude and switching said output circuit to said first operating state.

2. A magnetic-field-responsive proximity detector apparatus according to claim 1 wherein said voltage-level-sensing circuit switching device is in a nonconductive state when the voltage at said input is at a quiescent level and switches to a conductive state when the voltage at said input increases to at least a minimum level in response to an increase of said predetermined magnitude in said probe output voltage signal.

3. A magnetic-field-responsive proximity detector apparatus according to claim 2 wherein said switching device includes a junction semiconductor device having a base terminal and said voltage-level-sensing circuit includes means connected to said base terminal reverse biasing said semiconductor device to said nonconductive state when the voltage at said input does not exceed said minimum level.

4. A magnetic-field-responsive proximity detector apparatus according to claim 3 wherein said semiconductor device includes a grounded emitter terminal and a collector terminal connected in circuit with a positive voltage DC power source, and said output circuit includes an electrical solenoid coil connected in series circuit between said collector terminal and the power source for energization thereof when said semiconductor device is switched to a conductive state.

5. A magnetic-field-responsive proximity detector apparatus according to claim 1 wherein said magnetic-field-sensing device comprises a Hall-generator and said magnetic-field-sensing probe includes a pulse-form DC power supply providing a control current for driving said Hall-generator and voltage peak detector means connected to a Hall-voltage output of said Hall-generator for detecting the Hall-voltage and forming said probe output voltage signal in proportional relationship to the Hall-voltage.

6. A magnetic-field-responsive proximity detector apparatus according to claim 5 wherein said voltage peak detector means is operated synchronously with said pulse-form DC power supply thereby eliminating extraneous magnetic field effects which are of the same frequency as said pulse-form DC power supply.

7. A magnetic-field-responsive proximity detector apparatus according to claim 1 wherein said control circuit includes electrical energy storage means series connected between said probe and said voltage-level-sensing circuit input to receive said probe output voltage signal and provide an input voltage.

8. A magnetic-field-responsive proximity detector apparatus according to claim 1 wherein said first feedback circuit includes a semiconductor-switching device biased to a conductive state when said voltage-level-sensing circuit switching device provides a high voltage at the output terminal and biased to a nonconductive state when said switching device provides a low voltage, said semiconductor-switching device having collector and emitter terminals series connected between said regulated voltage source and said level-sensing circuit input to maintain the respective voltages equal when in a conductive state.

9. A magnetic-field-responsive proximity detector apparatus according to claim 8 which includes a resistance series connected between said semiconductor-switching device and said voltage-level-sensing circuit input to limit current flow thus inhibiting voltage regulation and permitting the voltage level at said input to rise for a rapid increase in said probe output voltage signal resulting in switching of said voltage-level-sensing circuit switching device to a conductive state.

10. A magnetic-field-responsive proximity detector apparatus according to claim 1 wherein said second feedback circuit includes a semiconductor-switching device having collector and emitter terminals series connected between said voltage-level-sensing circuit input and said switching device output terminal to maintain the respective voltages equal when in a conductive state, and biasing means connected between said semiconductor switching device and said switching output terminal to bias said semiconductor-switching device to a conductive state when a low voltage is provided at said voltage-level-sensing circuit output terminal.

11. A magnetic-field-responsive proximity detector apparatus according to claim 10 wherein said biasing means includes a voltage source and a timer-actuated switch mechanism, for selectively connecting said voltage source with said semiconductor-switching device, said timer-actuated switch mechanism connected to said voltage-level-sensing circuit output terminal to respond to a drop in the voltage at said output terminal to connect said voltage source to said semiconductor switching device after expiration of a predetermined time interval.

12. A magnetic-field-responsive proximity detector apparatus according to claim 10 which includes a diode connected between said voltage-level-sensing circuit input and said semiconductor-switching device to permit current flow from said input, and a resistance connected in shunt relationship to said diode, said resistance being of a relatively high value to limit current flow thus inhibiting voltage regulation and permitting the voltage level at said input to drop for a rapid decrease in said probe output voltage signal resulting in switching of said voltage-level-sensing circuit switching device to a nonconductive state.